United States Patent
Suriyanarayanan et al.

(10) Patent No.: US 10,331,950 B1
(45) Date of Patent: Jun. 25, 2019

(54) AUTOMATIC DOCUMENT SOURCE IDENTIFICATION SYSTEMS

(71) Applicant: Capital One Services, LLC, McLean, VA (US)

(72) Inventors: Vikram Suriyanarayanan, Schaumburg, IL (US); Joel Parker, Chicago, IL (US); Myoungho Shin, Hoffman Estates, IL (US); Deepak Shine, Schaumburg, IL (US); Nelson Lam, Springfield, VA (US); Jaideep Mokha, Chicago, IL (US); Ravali Sabbineni, Lindenhurst, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/011,717

(22) Filed: Jun. 19, 2018

(51) Int. Cl.
| | |
|---|---|
| *G06K 9/00* | (2006.01) |
| *G06N 7/00* | (2006.01) |
| *G06F 16/35* | (2019.01) |
| *G06F 16/30* | (2019.01) |
| *G06F 16/738* | (2019.01) |
| *H04L 29/08* | (2006.01) |
| *G06F 17/27* | (2006.01) |

(52) U.S. Cl.
CPC ....... *G06K 9/00469* (2013.01); *G06F 17/278* (2013.01); *G06K 9/00993* (2013.01); *G06N 7/005* (2013.01); *H04L 67/306* (2013.01)

(58) Field of Classification Search
CPC ........... G06F 17/30011; G06F 17/2785; G06F 17/30321; G06F 17/30336; G06F 17/3053; G06F 17/30619; G06F 16/353; G06F 16/30; G06F 16/739; G06F 17/278; G06N 7/005; G06N 3/08; G06K 9/00469; G06K 9/00993; H04L 67/306
See application file for complete search history.

(56) References Cited

U.S. PATENT DOCUMENTS

| | | |
|---|---|---|
| 6,009,199 A | 12/1999 | Ho |
| 7,376,635 B1 | 5/2008 | Porcari et al. |
| 7,561,734 B1 | 7/2009 | Wnek |
| 7,917,519 B2 | 3/2011 | Kimbrough et al. |
| 8,903,808 B2 | 12/2014 | Harinarayan et al. |

(Continued)

*Primary Examiner* — Kenny A Cese
(74) *Attorney, Agent, or Firm* — Troutman Sanders LLP; Christopher J. Forstner; John A. Morrissett

(57) ABSTRACT

A document source identification system includes one or more memory devices storing instructions, and one or more processors configured to execute the instructions to cause the system to receive uploaded document(s) having at least one extractable data entry. The system may categorize the document, and extract at least one data entry from the document. The system may normalize each extracted data entry and execute a deterministic ID search to determine that the normalized data entry matches zero, one, or more than one account data entries associated with user accounts. Responsive to an exact match, the system may link the uploaded document to a user account associated with the matching data entry. Responsive to zero or multiple matches, the system may execute a probabilistic ID search identifying a highest ranked user account data entry and link the document to a user account associated with the highest ranked user account data entry.

20 Claims, 6 Drawing Sheets

(56) References Cited

U.S. PATENT DOCUMENTS

| | | |
|---|---|---|
| 9,514,414 B1 | 12/2016 | Rosswog et al. |
| 2004/0194009 A1 | 9/2004 | LaComb et al. |
| 2004/0205448 A1* | 10/2004 | Grefenstette ........... G06F 16/30 |
| | | 715/230 |
| 2005/0060643 A1 | 3/2005 | Glass et al. |
| 2007/0027861 A1 | 2/2007 | Huentelman et al. |
| 2009/0313194 A1* | 12/2009 | Amar .................... G06F 16/353 |
| | | 706/20 |
| 2016/0308855 A1* | 10/2016 | Lacey .................. G06Q 50/265 |
| 2017/0345035 A1* | 11/2017 | Zeng .................... G06N 99/005 |
| 2018/0068019 A1* | 3/2018 | Novikoff ............... G06F 16/739 |
| 2018/0246974 A1* | 8/2018 | Shukla .............. G06F 17/30867 |

* cited by examiner

US 10,331,950 B1

AUTOMATIC DOCUMENT SOURCE IDENTIFICATION SYSTEMS

FIELD OF INVENTION

The present disclosure relates to automatic document source identification systems, and more particularly systems that identify the source(s) (e.g., user(s) associated with existing user account(s)) of uploaded documents by using machine learning to categorize and extract data from the documents and associate the extracted data to one or more respective existing user accounts with both deterministic and probabilistic user account matching.

BACKGROUND

Businesses often receive customer documents via fax, mail, and, with the rise of the digital age, the Internet. While it is easier to store and quicker to transmit digitally uploaded documents than their fax and mail counterparts, businesses face the burdensome task of categorizing and extracting data from customer documents and associating the extracted data with existing customers regardless of the medium in which the documents are received. For businesses that receive documents from a large customer base, manual categorization and data extraction from these documents can be tedious and error prone. To increase efficiency, some businesses rely on computerized systems to identify and sort different types of customer document types (e.g., Social Security Cards, Driver's Licenses, bank statements, etc.), though existing systems are often limited in efficiency and accuracy by requiring manual oversight to associate sorted documents with existing customers.

Accordingly, there is a need for improved systems for identifying the source(s) of uploaded documents that classify the documents, automatically extract useful data, and associate extracted data to respective user account(s). Embodiments of the present disclosure are directed to this and other considerations.

SUMMARY

Disclosed embodiments provide systems and methods for automatic document source identification.

Consistent with the disclosed embodiments, a document source identification system may include one or more memory devices storing instructions, and one or more processors configured to execute the instructions to perform steps of a method to automatically identify the source of document. The system may execute the instructions to receive one or more uploaded documents (e.g., Social Security Cards, Driver's Licenses, bank statements, etc.), with each uploaded document containing at least one extractable data entry (e.g., a Social Security Number "SSN" and name listed on a Social Security Card, a Driver's License Number, name, state, expiration date, and other information listed on a Driver's License, etc.). The system may categorize a first uploaded document based on the identified document type. After categorizing the document, the system may extract at least one extractable data entry from it before normalizing each extracted data entry by applying a business ruleset that transforms extracted data into a standardized form (e.g., an extracted SSN may be normalized into ###-##-#### format). When applicable, the system may tokenize extracted data that includes sensitive data entries (e.g., a SSN, entire financial account number, etc.). The system may then execute a deterministic identification ("ID") search to determine that the normalized (and, if applicable, tokenized) data entry matches zero, one, or more than one associated existing user accounts. To expedite the deterministic ID search, the system may also filter the plurality of user account data entries (each associated with an existing user account) based on the normalized first data entry to identify a first subset of user account data entries so that it can identify any matches from the first subset in lieu of searching for matches from all user account data entries. Responsive to identifying an exact match (or a single match with a confidence level that exceeds a predetermined confidence threshold), the system may link the first uploaded document to a first existing user account associated with the matching existing user account data entry. Otherwise, responsive to identifying either zero or multiple matches, the system may execute a probabilistic identification ("ID") search using a machine learning trained probabilistic matching model to identify a highest ranked user account data entry in the user account data entries (or just in the first subset of user account data entries in some embodiments) before linking the first uploaded document to a first existing user account associated with the highest ranked user account data entry.

Consistent with the disclosed embodiments, methods for automatically identifying the source of a document are disclosed.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
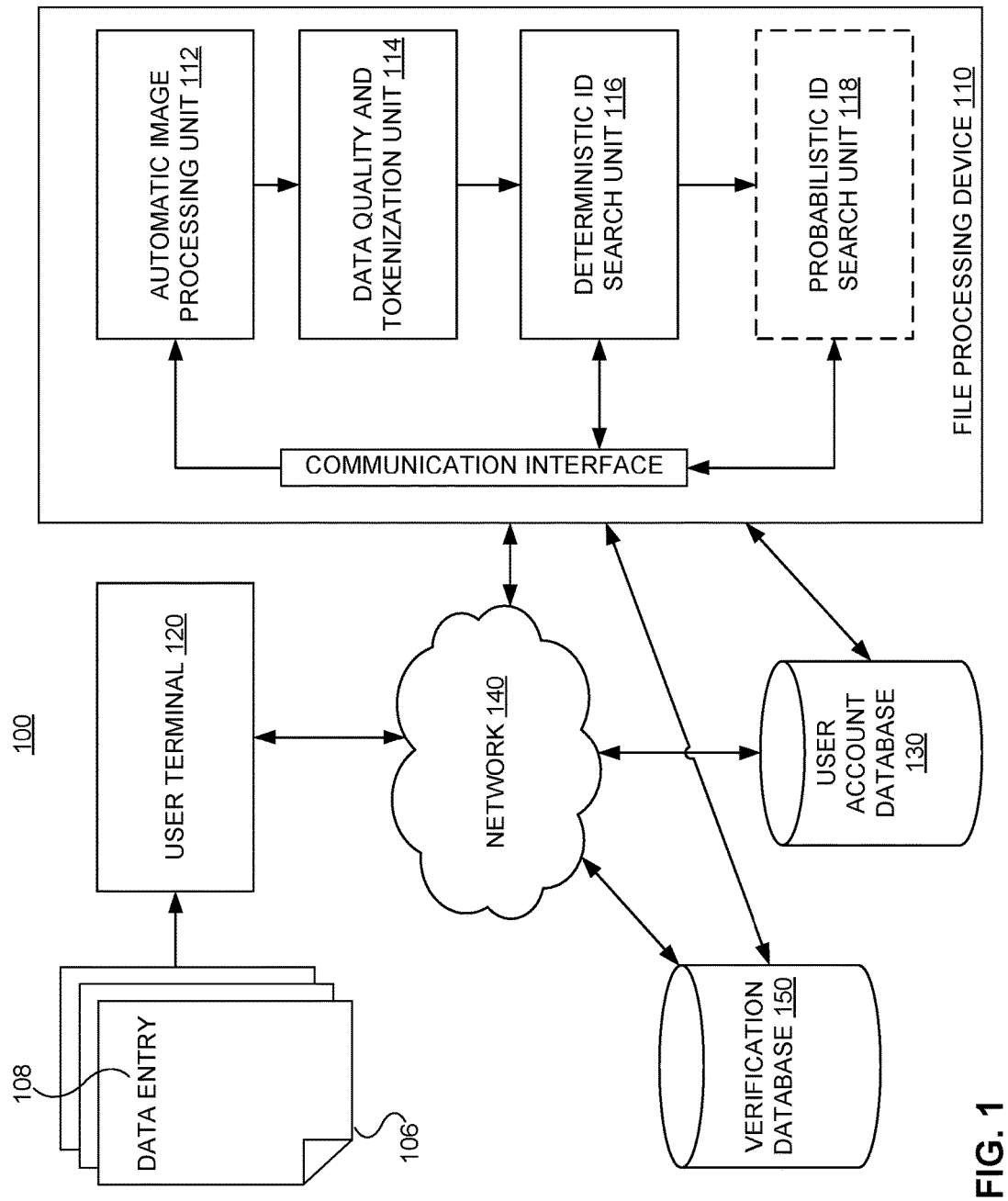
FIG. 1 is a work flow diagram of an exemplary automatic document source identification system.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to systems and methods for automating document source identification. In one aspect, the system may include one or more memory devices storing instructions, and one or more processors configured to execute the instructions to perform steps of a method. Specifically, in some embodiments, the system may execute the instructions to receive a first uploaded document having a first document type of a plurality of document types. Based on the first document type, the system may categorize the first uploaded document in a first document category. The system may then extract at least one extractable data entry from the first uploaded document based on the first document category. The at least one extractable data entry may include a first sensitive data entry, and the system may normalize it according to the business ruleset to produce a normalized first data entry before tokenizing the normalized first sensitive data entry. The system may execute a deterministic identification ("ID") search that includes filtering a plurality of user account data entries in a user account database based on the normalized first data entry to identify a first subset of user account data entries. Each user account data entry in the first subset may be associated with an existing user account. The deterministic ID search may also include determining that the normalized first data entry matches zero, one, or more than one user account data entries in the first subset. In response to determining that the normalized first data entry matches zero or more than one user account data entries (e.g., no exact match or match the passes a predetermined confidence threshold), the system may execute a probabilistic ID search using a machine learning trained probabilistic matching model to identify a highest ranked user account data entry in the first subset of user account data entries. Further, the system may link the first uploaded document to a first existing user account associated with either the one matching user account data entry in the first subset (identified via the deterministic ID search) or the highest ranked user account data entry in the first subset (identified via the probabilistic ID search).

In some embodiments, executing the probabilistic ID search may also include scoring each user account data entry in the first subset using the machine learning trained probabilistic matching model and identifying the highest ranked user account data entry in the first subset. The system may use a random forest machine learning classifier to execute the probabilistic ID search.

In some embodiments, the at least one data entry may include a verifiable data entry (e.g., a user's street address) corresponding to a verified data source. In such embodiments, the system may be further configured to verify the verifiable data entry based on communication with the verified data source.

In some embodiments the system is further configured to receive a second upload document having a second document type of the plurality of document types. The system may categorize the second uploaded document in a second document category based on the second document type, where the second document category indicates to the system the presence of at least one sensitive data entry. Responsive to the indication, the system may extract the sensitive data entry from the second uploaded document and tokenize the sensitive data entry.

In some embodiments the system is further configured to use a deep learning machine library for categorizing the uploaded documents. For example, the system may use the Keras and Tensorflow deep learning machine libraries to identify the document type of uploaded documents, and to further categorize the uploaded documents into their respective document category based on their document type.

In some embodiments, the uploaded document types may include bank statements, tax returns, Social Security Cards, and Driver's Licenses, although any document type including at least one extractable data entry may be included. In some embodiments, the system is further configured to use optical character recognition to extract the extractable data entries from the uploaded documents.

In another aspect, a document source ID system disclosed. The system may include one or more processors, associated with one or more memories, which processors execute the instructions to cause the system to receive a first uploaded document having a first document type of a plurality of predetermined document types each associated with a document category. The system may categorize the first uploaded document in a first document category based on its document type, extract at least one extractable data entry from the first uploaded document based on the first document category, and normalize the at least one extractable data entry according to the business ruleset to produce a normalized first data entry. The system may, based on the normalized first data entry, filter a user account database having a plurality of existing user account data entries each corresponding with an existing user account to identify a first subset of existing user account data entries. The system may determine whether the normalized first data entry matches a first existing user account data entry in the first subset of existing user account data entries. When the normalized first data entry is determined to match the first existing user account data entry, the system may link the first uploaded document to a first existing user account associated with the first user account data entry. When the normalized first data entry is determined to not match the first existing user account data entry, the system may score each existing user account data entry in the first subset of existing user account data entries using a machine learning trained probabilistic matching model to identify a first probabilistic matched existing user account data entry having the highest score. In response, the system may link the first uploaded document to a second existing user account associated with the first probabilistic matched existing user account data entry.

In some embodiments the at least one extractable data entry includes a sensitive data entry. The system may, in response to extracting the sensitive data entry, normalize the sensitive data entry and tokenize the normalized sensitive data entry. In some embodiments, the system may use a deep learning machine library to categorize the uploaded documents. In some embodiments, the predetermined document types of the uploaded documents may include bank statements, tax returns, Social Security Cards, and Driver's Licenses. In some embodiments, the system may use optical character recognition to extract the at least one extractable data entry from the uploaded documents. In some embodiments, the normalized first data entry used to identify the first subset of user account data entries may include one or more of a full name associated with an existing user account, an SSN associated with the existing user account, or a soundex of the full name. In some embodiments, the machine learning trained probabilistic matching model may include using a random forest machine learning classifier.

In yet another aspect, a document source ID method is disclosed. The method may include receiving a first uploaded document and extracting at one extractable data entry from it. The method may include normalizing the at extracted least one data entry according to the business ruleset. The method may further include executing a deterministic identification search. The deterministic identification search may include filtering a plurality of the user account data entries in a user account database based on the normalized first data entry to identify a first subset of user account data entries, wherein each user account data entry in the first subset of user account data entries may be associated with an existing user account. The deterministic identification search may further include determining that the normalized first data entry matches zero, one, or more than one user account data entries in the first subset of user account data entries. The method may further include executing a probabilistic identification search in response to determining that the normalized first data entry matches zero or more than one user account data entries. The method may further link the first uploaded document to a first existing user account associated with either the one matching user account data entry in the first subset of user account data entries or the highest ranked user account data entry in the first subset of user account data entries.

In some embodiments, the first uploaded document may have a first document type of a plurality of predetermined document types each associated with a corresponding document category, and the method may further include determining a first category corresponding to the first document type and extracting at least one extractable data entry from the first uploaded document based on the first document type. In some embodiments, the extractable data entry may include a sensitive data entry and the method may further include normalizing and tokenizing the sensitive data entry before executing the deterministic identification search.

Although some of the above embodiments are described with respect to systems, it is contemplated that embodiments with identical or substantially similar features may alternatively be implemented as methods and/or non-transitory computer-readable media, and vice versa.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 is a diagram of an exemplary document source identification ("ID") system 100 that may be used to perform one or more processes for automatically categorizing documents, extracting data therefrom, and associating extracted data with one or more existing customers to identify the source of those documents. The components and arrangements shown in FIG. 1 are not intended to limit the disclosed embodiments as the components used to implement the disclosed processes and features may vary. As shown, the system 100 may include a file processing device 110 configured to receive one or more uploaded documents 106 (e.g., Social Security Cards, Driver's Licenses, bank statements, etc.) from a user terminal 120 via network 140, request and receive user account information from a user account database 130 (directly or via the network 140), and request and receive verification data from a verification database 150 (directly or via the network 140). In this manner, the system 100 (e.g., via the user terminal 120) may upload documents 106 directly or via an external image capturing device (not shown) and transmit the uploaded documents 106 to the file processing device 110 over the network 140. The system 100 (e.g., via the file processing device 110) may interact with the user account database 130 and, optionally, the verification database 150 to perform one or more steps of the methods disclosed herein to identify a source (e.g., a user having an existing user account) of the uploaded document and associated it with that source.

In some embodiments, the file processing device 110 may include an automatic image processing unit 112, a data quality and tokenization unit 114, a deterministic ID search unit 116, a probabilistic ID search unit 118, and a communication interface that facilitates communication between the automatic image processing unit 112, the deterministic ID search unit 116, and the probabilistic ID search unit 118 and other components of the system 100 (e.g., the user account database 130, the verification database 150, and, via the network 140, the user terminal 120).

In some embodiments, the system 100 may upload and transmit (e.g., via the user terminal 120) an uploaded document 106 having a plurality of document types, with each of the plurality of document types including at least one extractable data entry 108. The file processing device 110 may receive the uploaded document 106 through communication with the user terminal 120 via the network 140. The automatic image processing unit 112 may identify the uploaded document 106 to be one of the plurality of document types, and based on the document type, the automatic image processing unit 112 may further categorize the uploaded document 106. In some embodiments, the automatic image processing unit 112 may implement a deep learning machine library to automatically categorize uploaded document 106. For example, a social security card may be tagged by the automatic image processing unit 112 before the uploaded document 106 is saved to a user account database 130. The automatic image processing unit 112 may further extract the at least one extractable data entry 108 from the received document 106.

The data quality and tokenization unit 114 may further process the received document 106 by normalizing the at least one extractable data entry 108 into a standard form according to the business ruleset. In the case where the at least one extractable data entry 108 includes sensitive data, the data quality and tokenization unit 114 may further tokenize the at least one sensitive extractable data entry. In some embodiments, the data quality and tokenization unit 114 may verify certain extractable data entries 108 that include verifiable extractable data entries by communicating with verification database 150 via the network 140.

According to some embodiments, the deterministic search ID unit 116 may link an existing user account to the uploaded document 106 by analyzing the at least one extractable data entry 108 and comparing the at least one extractable data entry 108 to a filtered subset of the data entries stored in user account database 130. In response to identifying an exact match, the deterministic search ID unit 116 may link the uploaded document 106 to the existing user account associated with the one matching user account data entry in the filtered subset of user account data entries. In response, the system 100 may add the uploaded document 106 to the existing user account stored on the user account database 130.

In response to the deterministic search ID unit 116 identifying zero or more than one matches, the probabilistic ID search unit 118 may link the at least one extractable data entry 108 of the uploaded document 106 to a highest ranked user account data entry in the filtered subset of user account data entries. Accordingly, in some embodiments, system 100 may be configured so that the file processing device 110 may communicate via the network 140 with a user account database 130 to link the uploaded document 106 to a corresponding user account located on the user account database 130.

Figure 2:
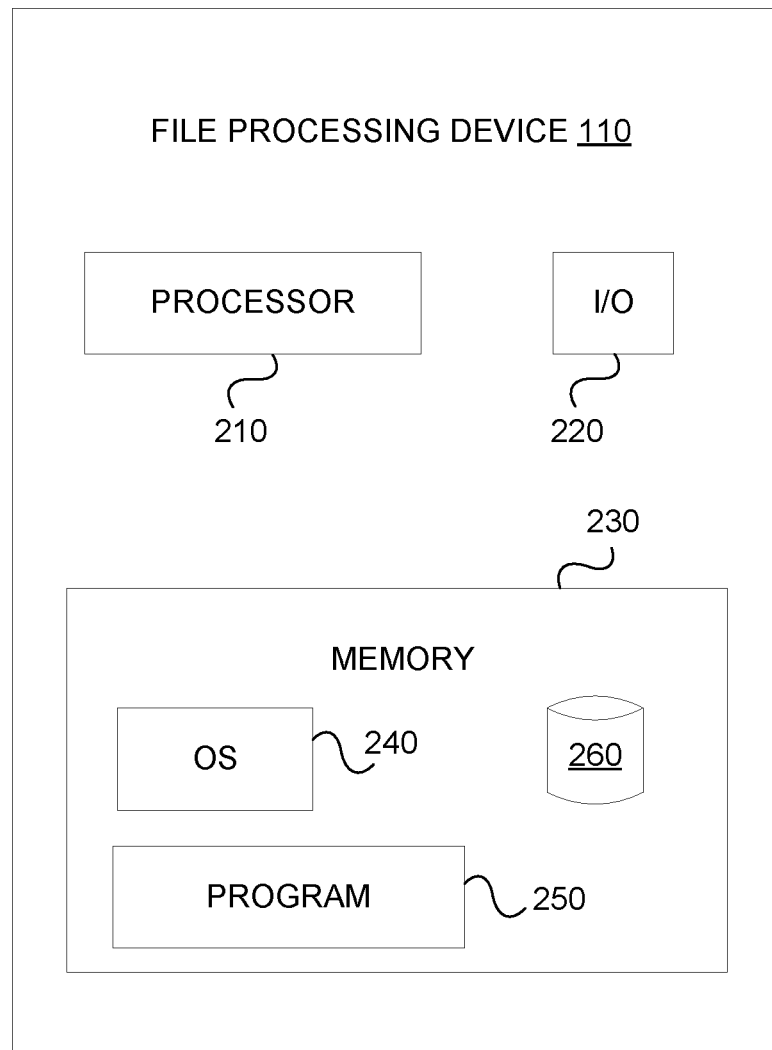
FIG. 2 is a component diagram of an exemplary file processing device.

As shown in more detail in FIG. 2, the file processing device 110 may include a processor 210, an input/output ("I/O") device 220, a memory 230 containing an operating system ("OS") 240, a program 250, and in some embodiments, a user account database 260. For example, the file processing device 110 may be a single device or server or may be configured as a distributed computer system including multiple servers, devices, or computers that interoperate to perform one or more of the processes and functionalities associated with the disclosed embodiments. In some embodiments, the file processing device 110 may further include a peripheral interface, a transceiver, a mobile network interface in communication with the processor 210, a bus configured to facilitate communication between the various components of the file processing device 110, and a power source configured to power one or more components of the file processing device 110. Servers, databases, and other computing devices (e.g., the user terminal 120) that may store the uploaded document 106 may include many components that are similar to or even have the same capabilities as those described with respect to the file processing device 110.

A peripheral interface may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

The processor 210 may be one or more known processing devices, such as a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

The file processing device 110 may include one or more storage devices configured to store information used by processor 210 (or other components) to perform certain functions related to the disclosed embodiments. In some embodiments, the file processing device 110 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the file processing device 110 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, the file processing device 110 may include memory 230 that may include one or more programs 250 to perform one or more functions of the disclosed embodiments. Moreover, processor 210 may execute one or more programs 250 located remotely from system 100. For example, system 100 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, Mongo databases, SharePoint™ databases, Oracle™ databases, Sybase™ databases, or other relational or non-relational databases. Memory 230 may include software components that, when executed by processor 210, perform one or more processes consistent with the disclosed embodiments. In some embodiments, memory 230 may include a database 260 for storing related data to enable the file processing device 110 to perform one or more of the processes and functionalities associated with the disclosed embodiments.

The file processing device 110 may also be communicatively connected to one or more memory devices (e.g., databases) locally or through a network. The remote memory devices may be configured to store information and may be accessed and/or managed by the file processing device 110. By way of example, the remote memory devices may be document management systems, Microsoft™ SQL database, Mongo databases, SharePoint™ databases, Oracle™ databases, Sybase™ databases, or other relational or non-relational databases. Systems and methods consistent with disclosed embodiments, however, are not limited to separate databases or even to the use of a database. In some embodiments, the user account database 130 may be capable of asynchronous communication with the system so that database requests may be processed as a background process during the user's experience.

The file processing device 110 may also include one or more I/O devices 220 that may comprise one or more interfaces for receiving signals or input from devices and providing signals or output to one or more devices that allow data to be received and/or transmitted by the file processing device 110. For example, the file processing device 110 may include interface components, which may provide interfaces to one or more input devices, such as one or more keyboards, mouse devices, touch screens, track pads, trackballs, scroll wheels, digital cameras, microphones, sensors, scanners, and the like, that enable the file processing device 110 to receive data from one or more users.

In exemplary embodiments of the disclosed technology, the file processing device 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the file processing device 110 have been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the file processing device 110 may include a greater or lesser number of components than those illustrated.

Returning to FIG. 1, the user terminal 120 may have some or all of the components of the filing processing unit 110. The user terminal 120 may be a mobile computing device carried by a user of the system, or in other embodiments, the user terminal 120 may include a merchant terminal, such as a terminal available for use at the merchant location and/or point-of-sale location. The user terminal 120 may capture the uploaded document 106 by using various I/O components as described more fully in reference to FIG. 2 (e.g., digital camera, scanning device, etc.). Accordingly, the user terminal 120 may receive an uploaded document 106 having at least one extractable data entry 108. As all the other components 110-150, the user terminal 120 may be in communication with system 100 through network 140 locally or remotely.

The user account database 130 may be an external storage device, such as an external database, computing device, server, or cloud server. The user account database 130 may store existing user accounts comprising data entries associated with each respective user account. The user account database 130 may communicate either directly to the file processing device 110, or via the network 140 with any of the other components of system 100. By way of example, the user account database may be a document management system, Microsoft SQL database, SharePoint database, Oracle™ database, Sybase™ database, Mongo database, or any other relational database.

Facilitating communication between components of the system 100, the network 140 may be of any suitable type, including individual connections via the Internet such as cellular or WiFi networks. In some embodiments, the network 140 may connect terminals, services, and mobile devices using direct connections such as radio-frequency identification (RFID), near-field communication (NFC), Bluetooth™, low-energy Bluetooth™ (BLE), WiFi™, Ethernet, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 140 may comprise any type of computer networking arrangement used to exchange data. For example, a network may be the Internet, a private data network, virtual private network using a public network, and/or other suitable connection(s) that enables components in system 100 to send and receive information between the components of the system 100 or to and from computing devices that are external to the system 100. The network 140 may also include a public switched telephone network ("PSTN") and/or a wireless network.

The verification database 150 may be an external storage device, such as, for example, an external database, computing device, server, or cloud server. The verification database 150 may store information comprising verified data associated with a respective user. For example, without limitation, verified data may comprise an individual's street address or SSN so that the system 100 may verify certain extractable data entries 108 that include verifiable extractable data entries. The verification database 150 may be a local storage device communicating with the other components of system 100 via the network 140, and in other embodiments, may communicate remotely with the system 100 via the network 140. Similarly to user account database 130, the verification database 150 may be a document management system, Microsoft SQL database, SharePoint database, Oracle™ database, Sybase™ database, Mongo database, or any other relational database. In other embodiments, the file processing device 110 may locally house the user account database 130 and/or the verification database 150 such that no external storage is required.

Figure 3:
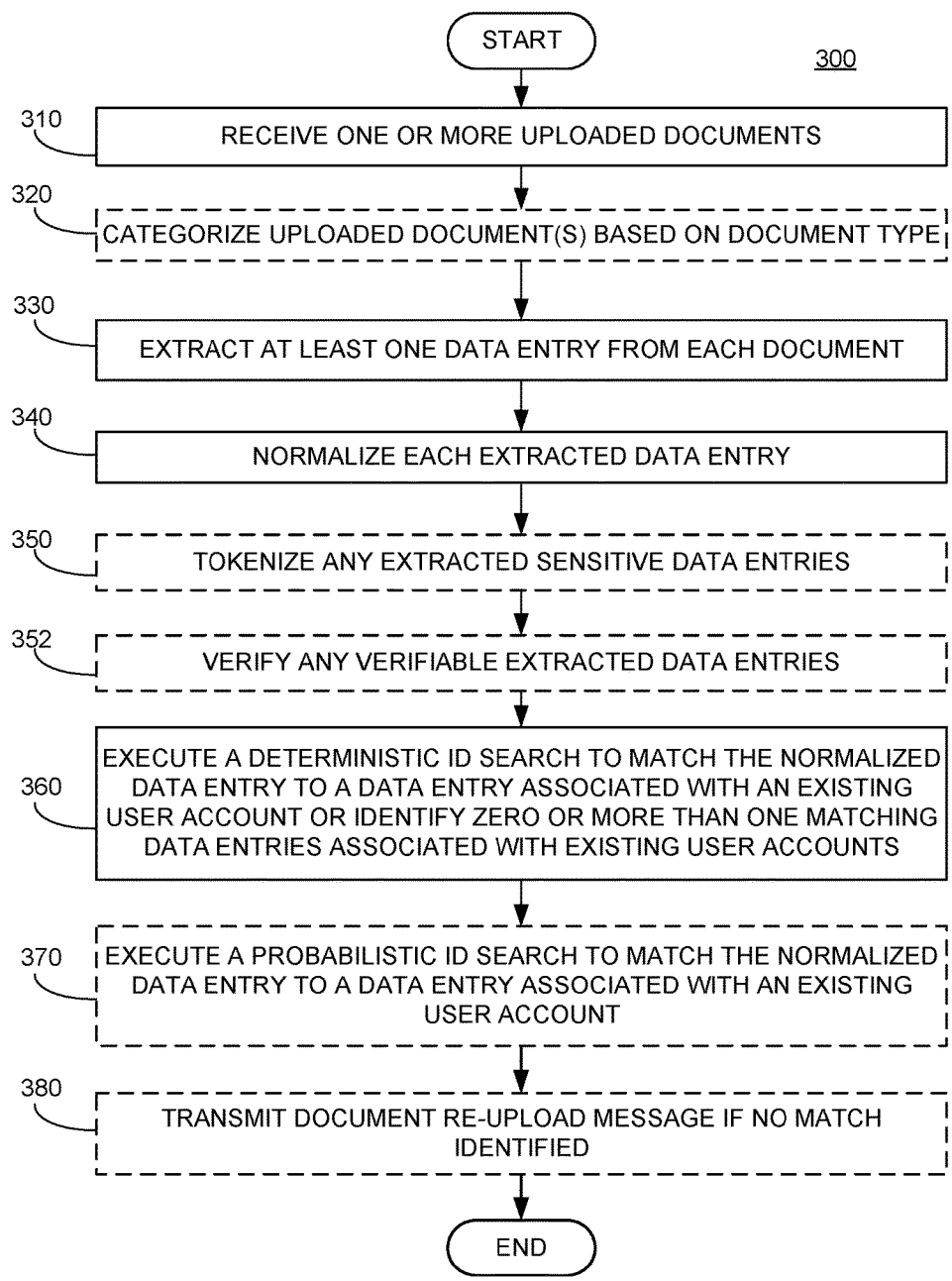
FIG. 3 is a flowchart of an exemplary document source identification process.

FIG. 3 shows a flowchart of an exemplary method 300 for document source identification. System 100 (e.g., via the file processing device 110) may perform one or more steps of the method 300.

In block 310, the system (e.g., system 100) may receive (e.g., via the file processing device 110) one or more uploaded documents each having a document type out of a plurality of predetermined document types. According to some embodiments the predetermined document types may include, for example, a Driver's License, a Social Security Card, or any other document with at least one extractable data entry 108 that may be used to associate the uploaded document 106 to a corresponding user account located on the user account database 130. In some embodiments, the file processing device 110 may receive one or more uploaded documents 106 from the user terminal 120 via the network 140. The user terminal 120 may capture the uploaded document 106 using various I/O components shown in FIG. 2 (e.g., with a digital camera, scanner, or other image capturing device). In some embodiments, the user terminal 120 may include a merchant terminal capable of receiving and/or uploading the uploaded document 106 using various I/O devices described more fully in reference to FIG. 2.

In block 320, the system (e.g., via the automatic image processing unit 112) may use machine learning to classify the received documents into a respective document type (e.g., Driver's License, Social Security Card, etc.). The system may utilize, for example and without limitation, either the Keras framework or the Tensorflow machine learning framework for categorizing the uploaded document into its respective document type. The Keras and Tensorflow machine learning frameworks may include datasets including documents of various document types. The framework may take features of the documents and use a machine learning algorithm to use the various features of the documents to match the documents to predetermined document categories. The automatic image processing unit 112 may, in some embodiments, improve the accuracy with which the system 100 categorizes the uploaded documents 106 with every document uploaded, because the machine learning model improves in accuracy as the sample size of uploaded documents increases. Further, the machine learning framework may improve in accuracy with the optimization of various parameters of the machine learning framework.

In block 330, the system (e.g., via the file processing device 110) may extract at least one extractable data entry 108 from each uploaded document 106. In some embodiments, each extractable data entry 108 may include one or more of a user name, document number, user's date of birth, street address, tax identification number, bank account number, age, phone number, or the like. In some embodiments, the extractable data entry or entries 108 may be extracted using optical character recognition (OCR) technology. In some embodiments, the extractable data entry or entries 108 may be extracted by using Tesseract and OpenCV engines. In another embodiment, the machine learning model training may be implemented within the Tesseract and OpenCV frameworks to identify the at least one extractable data entry 108. The machine learning model training within Tesseract and OpenCV may include training datasets including documents with a plurality of extractable data entries 108. The machine learning model uses training datasets to learn how to recognize extractable data entries 108. The machine learning model may further utilize testing datasets to test its recognition of extractable data entries 108. In some embodiments, the machine learning model may improve the accuracy with which the automatic image processing unit 112 extracts the extractable data entries 108.

In block 340, the system may normalize each extractable data entry 108. For example, if the extractable data entry 108 comprises a SSN in the form 123-45-7890, it may be normalized to 123457890 according to a business ruleset. The business ruleset may include standardization routines for commonly detected data types. The business ruleset may remove all punctuation from an extracted phone number (e.g., (441)958-3321 would become 4419583321). As a further nonlimiting example, the business ruleset may cause the data quality and tokenization unit 114 to normalize the extractable data entry 108 comprising a street address by formatting it to observe United States Postal Service (USPS) postal addressing standards. USPS postal addressing standards include standardized abbreviations for common street markers such as "Ave." for Avenue and "St." for Street. Accordingly, the business ruleset may format extractable data entries 108 including postal addresses to observe these standards.

In block 350, when the extractable data entry 108 includes sensitive data (e.g., SSN on a Social Security card, account number on a bank statement data, etc.), the extractable data entry 108 may be tokenized before proceeding. The data quality and tokenization unit 114 may, in some embodiments, tokenize data entries 108 that include sensitive data entries (e.g., the entire data entry 108 or at least the portion of the data entry 108 containing sensitive data). For example, the data quality and tokenization unit 114 may tokenize an SSN such as 123456789 by encrypting the sensitive data entry 108 with an encryption key stored securely on the system 100 and returning to the data quality and tokenization unit 114 ihoBOe3hH. The system may store the unencrypted sensitive data entry 108 only temporarily in RAM to further secure the sensitive data so that only the tokenized version of the sensitive data entry is permanently or semi-permanently stored on the system. The tokenized data entry may be used in place of the extractable data entry 108 for sensitive data entries, for the protection of a customer's sensitive information.

In block 352, when the extractable data entry 108 includes verifiable data (e.g., a user's street address), the extractable data entry 108 may be verified before proceeding. The data quality and tokenization unit 114 may, in some embodiments, verify data entries 108 that include verifiable data entries (e.g., the entire data entry 108 or at least a portion of the data entry 108 containing verifiable data). For example, the data quality and tokenization unit 114 may first determine that the extractable data entry corresponds to a street address. The data quality and tokenization unit 114 may validate the street address by communicating with a third-party verification service (e.g., SmartyStreets).

Figure 4:
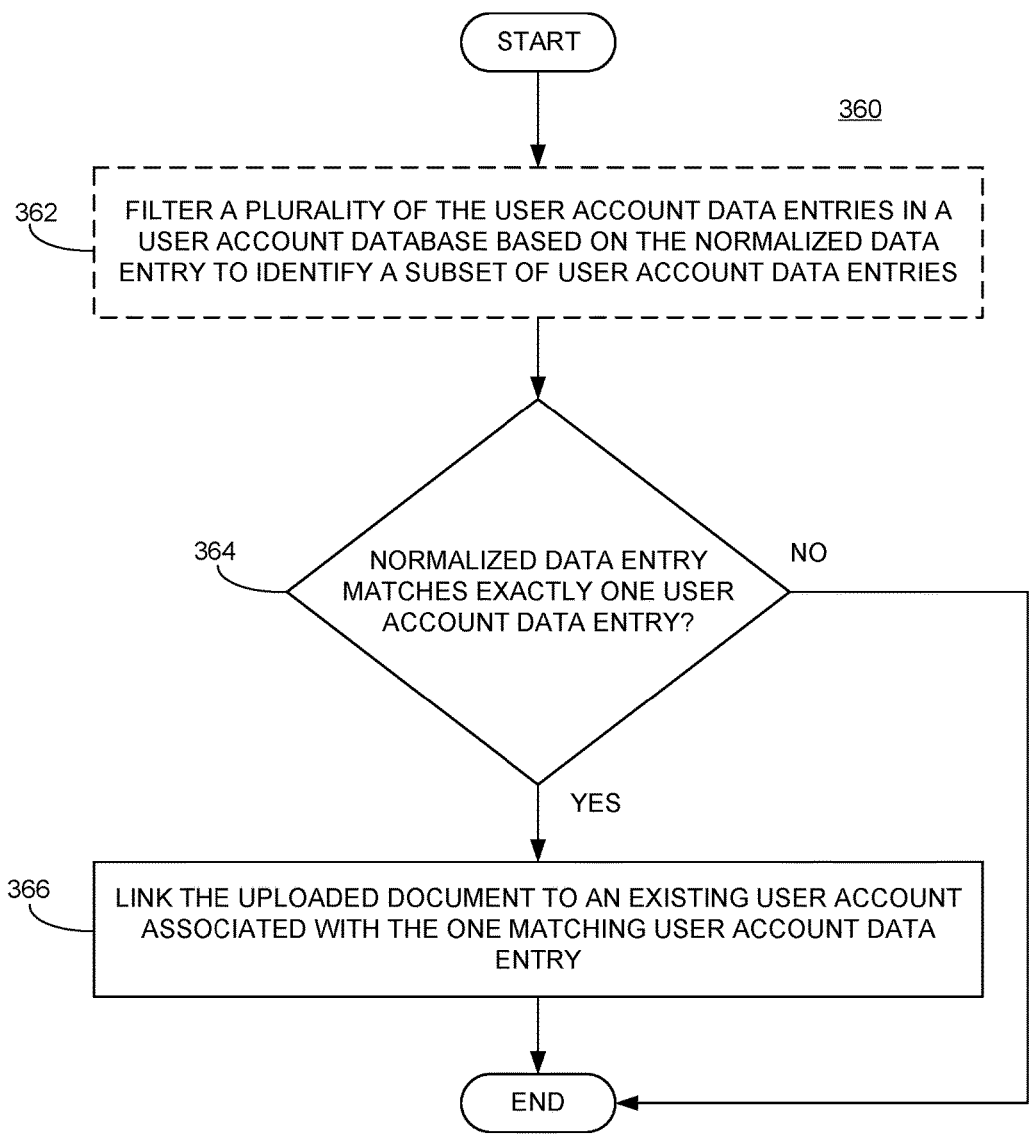
FIG. 4 is a flowchart of an exemplary deterministic ID search unit process.

In block 360, the deterministic ID search unit 116 may execute a deterministic ID search to match the at least one normalized extractable data entry 108 to zero, one, or more than one data entries associated with an existing user account (e.g., a user account data entry) stored on the database 130 in order to link the uploaded document 106 to the matching existing user account. As shown in more detail in FIG. 4, block 360 may include filtering user account data entries to identify a subset of user account data entries at block 362, determining whether the normalized data entry matches exactly one user account data entry from the subset at block 364, and linking the uploaded document to an existing user account associated with the one matching user account data entry based on the determination in block 366.

The deterministic ID search unit 116 may optionally filter (block 362) the existing user account data entries stored on the user account database 130 based on at least a portion of the normalized data entry 108 to create the subset of existing user account data entries in order to expedite the deterministic ID search and save processing power compared to searching the entire user account database 130. For example, in some embodiments, the deterministic ID search unit 116 may filter (block 360) existing user account data entries by the first (or first two, three, or more) digit(s) of a SSN, the city, state, and/or zip code on a driver's license, the first (or first several) character(s) of a last name on any document listing a customer or user name, a portion of a soundex of the customer's name, etc. to match those corresponding digits, characters, or soundex of the normalized extractable data entry. Balancing the goals of expeditious processing (e.g., by decreasing the number of user account entries in the resulting subset) and maintaining accuracy levels, the deterministic ID search unit 116 may iteratively filter the subset until the resulting number of user account data entries in the subset is within a predetermined range. For example, starting with 500,000 user account data entries in the user account database 130, the deterministic ID unit 116 may initially filter the data entries to those that contain some variation of "Washington" and/or "D.C." to match the city in the address of the normalized data entry, resulting in 38,000 user account data entries. With a predetermined range for the subset set between 500 to 1,000 data entries, the deterministic ID unit 116 may iteratively add filters (e.g., limiting the 38,000 data entries to those that additionally having a zip code 12345 to result in 15,000 data entries, and then to those additionally having a last name starting with "Ab" to result in 1,200 data entries). Similarly, if the initial filtering would result in too few data entries in the subset, the deterministic ID unit 116 may remove certain filters or portions thereof to account for typographical errors and data inconsistencies. In some embodiments, if multiple uploaded documents 106 are received together and/or from the same user terminal 120, the deterministic ID unit 116 may retain the filtered subset of user account data entries for executing the deterministic ID search on the subsequent uploaded document(s) 106 in the set and/or from the same user terminal 120.

Regardless of whether filtering is performed in block 362, the deterministic ID search unit 116 may determine that the normalized extractable data entry 108 matches zero, one, or more than one of the user account data entries in either the subset or the entire user account database 130 in block 364. An exact match occurs when all the normalized data entries 108 exactly match the plurality of user account data entries such that the deterministic ID search unit 116 may link the uploaded document 106 with its corresponding existing user account. Zero matches may occur when the normalized extractable data entry 108 does not match (e.g., beyond a predetermined confidence threshold) any existing user account data entries stored on the user account database 130. The predetermined confidence threshold may be set to adjust for typographical errors and data inconsistencies (e.g., such that a one-digit discrepancy on the zip code of an otherwise 100% match), and may take into account machine learning. More than one match may occur when the normalized data entry 108 matches (e.g., beyond a predetermined confidence threshold) existing user account data entries associated with more than one existing user account stored on the user account database 130.

In response to determining exactly one match to the normalized extractable data entry 108, the deterministic ID search unit 116 may link the uploaded document 106 to an existing user account associated with the one matching user account data entry at block 366. The deterministic ID search unit 116 may save the uploaded document 106 to an appropriate directory of user database 130 associated with the corresponding user account on the user database 130.

Figure 5:
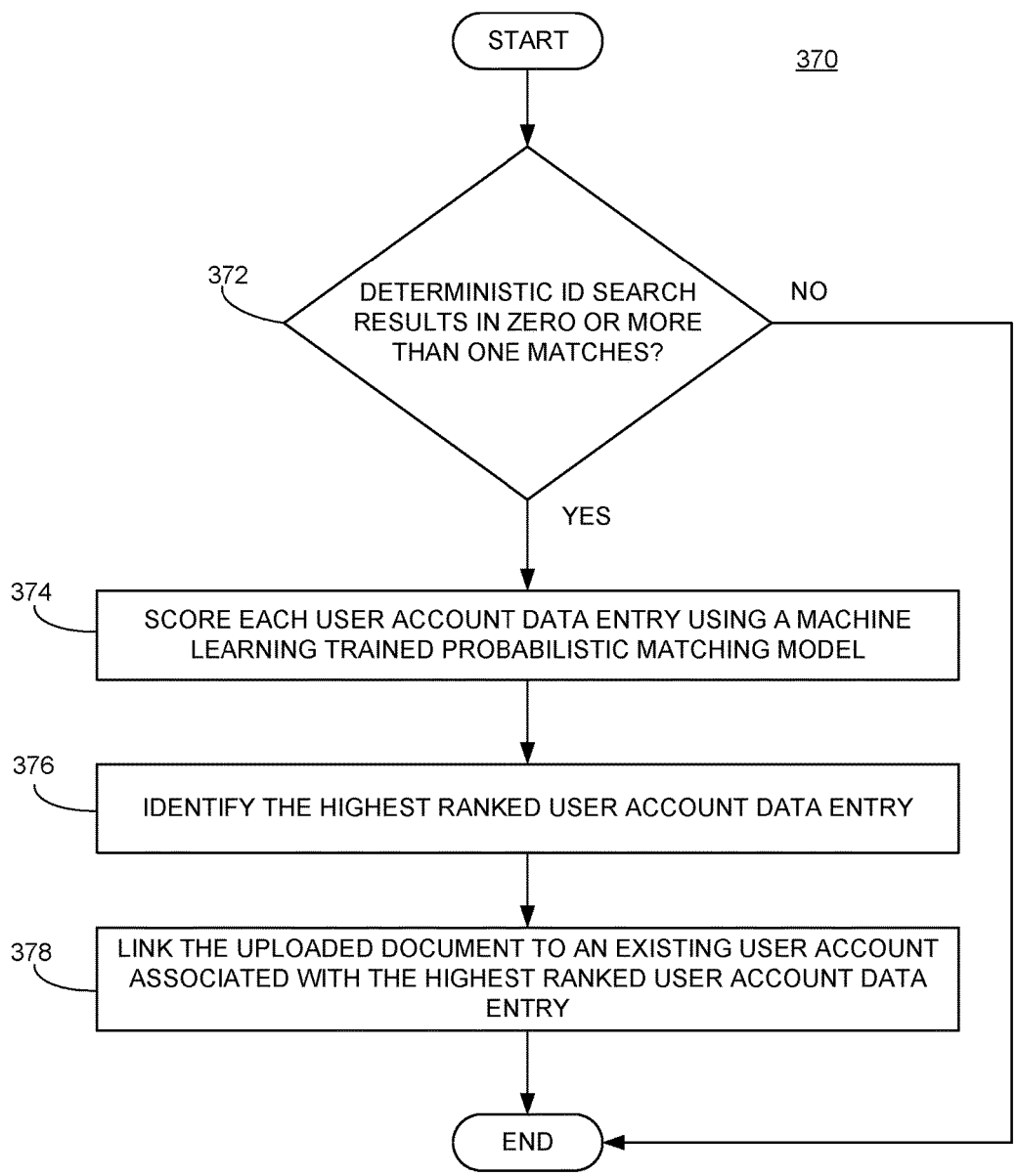
FIG. 5 is a flowchart of an exemplary probabilistic ID search process.

Returning to FIG. 3, when no matches or multiple matches are identified in block 364 (or block 360), the probabilistic ID search unit 118 may perform a probabilistic ID search to match the normalized extractable data entry 108 to a user account data entry at block 370. As shown in more detail in FIG. 5, executing the probabilistic ID search in block 370 may include determining that the deterministic ID search in block 360 resulted in zero or multiple matches (e.g., beyond a predetermined confidence threshold) at block 372, scoring or ranking each user account data entry user a machine learning trained probabilistic matching model in block 374, identifying the highest ranked user account data entry in block 376, and linking the uploaded document 106 to an existing user account associated with the highest ranked user account data entry in block 378.

Based on an output from the deterministic ID unit 116 (e.g., whether the uploaded document 106 has been linked to an existing user account), the probabilistic ID search unit 118 may determine that the normalized extractable data entry 108 matches zero or more than one of the user account data entries to initiate the probabilistic ID search in block 372. For quality control purposes, and if processing time and capacity is less critical, the system may employ a higher predetermined confidence threshold in determining zero, one, or multiple matches in the deterministic ID search to result in most non-100% exact matches requiring a probabilistic ID search for confirmation. The probabilistic ID search unit 118 may set the field of user account data entries to search based on the deterministic ID search. For example, in some embodiments, the system may limit the field of user account data entries for the probabilistic ID search to the filtered subset of user account data entries (as opposed to all user account data entries in database 130) to expedite the probabilistic ID search. Depending on the results of the deterministic ID search (e.g., if there were multiple matches that passed the predetermined confidence threshold of 98% or if there were no "matches" and multiple "near matches" that passed a lower predetermined confidence threshold of 80%), the system may limit the field of user account data entries to just those matches or near matches for expedited processing. If the deterministic ID search resulted in no matches or near matches, the system may expand the field of user account data entries to a larger subset or all data entries in database 130 to ensure greater accuracy.

Once the probabilistic ID search has been initiated and the field of user account data entries has been set in block 372, the probabilistic ID search unit 118 may score each user account data entry in that field using the machine learning trained probabilistic matching model in block 374. In some embodiments the machine learning trained probabilistic matching model may include the random forest machine learning classifier or any other suitable machine learning classifier, and the classifier may construct decorrelated decision trees, with each decorrelated decision tree yielding a best match to match between the normalized extractable data entry 108 and the field of existing user account entries. The random forest machine learning classifier may tally the matches of each uncorrelated decision tree to identify the highest ranked user account data entry. In some embodiments, the system may construct a multitude of decision trees during training of model in a process called bagging, where noisy and unbiased models are averaged to create a machine learning model with low variance in terms of classification. The random forest algorithm may construct a large collection of decorrelated decision trees by sampling available data and classifying any given data set into its respective category.

With the user account data entries in the field (e.g., in the filtered subset of data entries, the multiple matches or near matches from the deterministic ID search results, or from the entire database 130) scored or ranked in block 374, the probabilistic ID search unit 118 may identify the highest ranked user account data entry in block 376. In some embodiments, the probabilistic ID search unit 118 may identify the highest ranked user account data entry according to the method employed by the random forest machine learning classifier, where decorrelated decision trees are constructed at random and the best match of each decorrelated decision tree is counted as a vote. The probabilistic ID search unit 118 may tally each match and identify the highest ranked user account data entry according to which user account data entry receives the highest number of votes in the random forest machine learning classifier. In some embodiments, system may determine whether the highest ranked user account data entry has a match confidence threshold exceeding a predetermined value to continue the automated process. For example, if the highest rank user account data entry has a match confidence below the predetermined threshold, the system may transmit the results of the probabilistic ID search to a display and prompt an operator to manually review before proceeding to block 378.

Once a highest ranked user account data entry has been identified in block 376, the probabilistic ID search unit 118 may link the uploaded document 106 to an existing user account associated with the highest ranked user account data entry in block 378. In some embodiments, the probabilistic ID search unit 118 may save the uploaded document 106 to a directory in user account database 130 corresponding to the existing user account associated with the highest ranked user account data entry from block 376.

Returning to FIG. 3, in some embodiments the deterministic ID search may not return an exact match, and the probabilistic ID search may not determine a highest ranked user account data entry exceeding a predetermined value. When neither the deterministic ID search unit 116 nor the probabilistic ID search unit 118 return a match, the system may transmit a document re-upload message to the user in block 380 (e.g., via e-mail or other communication channel to user terminal 120).

Figure 6:
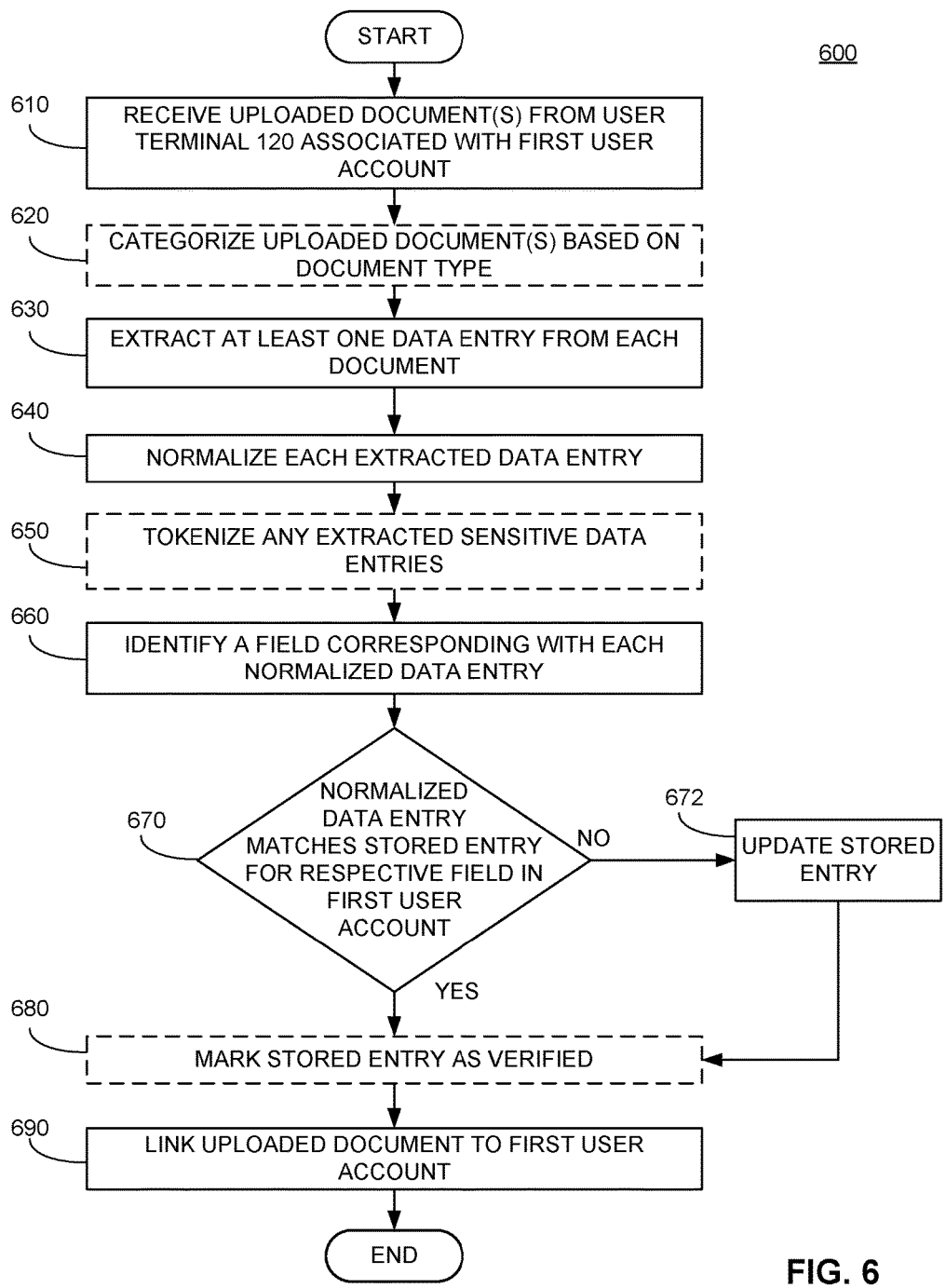
FIG. 6 is a flowchart of an exemplary document source verification process.

In some embodiments, when the user terminal 120 is known to be associated with a first user account, documents 106 uploaded via the user terminal 120 are already understood to be associated with the first user account. Even with this presumed association between the user terminal 120 and its uploaded documents 106, it is sometimes advantageous for the system to verify stored information corresponding to the first user account against the extractable data 108 from the uploaded document 106. For example, such verification can maintain quality control by ensuring that the user terminal 120 is still associated with the first user account, the data stored in the first user account matches information on the uploaded document(s) 106, and that the document(s) 106 were uploaded without issue. Accordingly, FIG. 6. shows a flowchart of an exemplary method 600 for document source verification. System 100 (e.g., via the file processing device 110) may perform one or more steps of the method 600. Further, some of the steps of the method 600 may closely resemble or overlap with steps of the method 300.

Blocks 610-650 resemble corresponding blocks 310-350 as discussed with respect to the method 300. In block 610, the system may receive one or more uploaded documents 106 each having a document type out of a plurality of predetermined document types. In block 620, the system may optionally use machine learning to classify the received documents 106 into their respective document type. In block 630, the system may extract at least one extractable data entry 108 from each uploaded document 106. In block 640, the system may normalize each extractable data entry. In block 650, when the extractable data entry 108 includes sensitive data, the extractable data entry 108 may be tokenized before proceeding. Though not shown in FIG. 6, some embodiments of the method 600 may include verifying any verifiable data entries in the extractable data entry 108 in a similar fashion to that described in block 352 for the method 300.

In block 660, the system may identify a field corresponding with each normalized data entry 108. By identifying the field, which may be performed by taking into account the categorization performed in block 620, the system can compare like-for-like stored data in a user account with the extractable data entry 108 in block 670. For example, when the uploaded document 106 is determined to have a Social Security card document type, the system may identify a 9-digit extractable data entry 108 as corresponding to an "SSN" field. By doing so, the system can compare the 9-digit extractable data entry 108 to stored data entries in the "SSN" field. Even without categorizing the uploaded document 106 based on document type, the system may identify an "SSN" field as corresponding to a 9-digit extractable data entry 108 or an "address" field corresponding to an extractable data entry 108 starting with one or more digits followed by a plurality of text characters followed by an at least 5-digit zip code. The system may identify the field at least in part based on one or more of the proximate location of the extractable data entry 108 on the uploaded document 106, the presence of one or more additional extractable data entries 108, and the location of one or more additional extractable data entries 108 (again, regardless of whether the uploaded document 106 was categorized). For example, when the uploaded document 106 includes a centrally positioned extractable data entry 108 having two or three sequences of letter characters (e.g., a name) and, slightly above and centrally aligned, a 9-digit extractable data entry 108, the system may associate the two to three-character sequences extractable data entry 108 with a "name" field and the 9-digit extractable data entry 108 with an "SSN" field.

Once the field corresponding with each normalized data entry 108 has been identified, in block 670, the system (e.g., via the file processing device 110) may determine whether the normalized data entry 108 matches the entry stored in the respective field of the first user account data. As discussed with respect to block 660, the system may conduct a like-for-like comparison of stored and extracted data entries (e.g., comparing a stored SSN associated with an "SSN field" with a 9-digit extractable data entry 108 associated with the "SSN" field). In response to the normalized data entry differing from the entry in the field of the first user account, the system may update the stored entry in block 672. For example, when the first existing user account's stored "SSN" field entry of 123456788 is compared to an extracted data entry 108 of 123456789, the system may replace the stored entry in the "SSN" field with the corresponding extracted data entry 108 from the uploaded document 106. In response to the normalized data entry matching the entry in the corresponding field of the first user account, the system may mark the stored entry as verified in block 680. Regardless of whether the system marks the stored entry as verified, the system may link the uploaded document 106 to the first user account in block 690. However, in other embodiments, the system may require that a predetermined threshold number or percentage of extractable data entries 108 match stored data entries in corresponding fields before linking the uploaded document 106 to the first user account. For example, when two or more or at least 75% of extracted data entries 108 from a single uploaded document 106 match stored data entries in a corresponding field, the system may link uploaded document 106 to the first user account. Conversely, when the number of non-matching data entries exceeds a predetermined threshold (e.g., less than two matching entries or less than 75% matching entries), the system may transmit a document re-upload message in a similar fashion to that described in block 380 or prompt an operator to manually review and confirm that the user terminal 120 is still associated with the first user account.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, and voice command devices, along with peripherals that interface with these devices.

For ease of discussion, embodiments may be described in connection with receiving and processing a document containing at least one extractable data entry which may be used to link a received document with an existing customer account. It is to be understood, however, that disclosed embodiments are not limited to linking a received document with an existing user account, but may be used to classify a collection of documents by its respective source, where each document is associated with a specific source. Further, steps or processes disclosed herein are not limited to being performed in the order described, but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following exemplary use case describes an example of a typical user flow pattern. They are intended solely for explanatory purposes and not in limitation. A customer or individual applying for a loan, job, security clearance, etc. may, after creating an online profile with a financial service provider, merchant, government agency, etc., need to upload one or more relevant or required documents 106 (e.g., a social security card and driver's license as part of the loan application) to a system (e.g., system 100) that can automatically and efficiently categorize and extract data from each uploaded document before associating that document with an existing user account. The customer may upload the document(s) 106 via the user terminal 120 and transmit them to the file processing device 110 for processing. As the document(s) 106 are received, the file processing unit 110 may categorize the uploaded document(s) 106 based on the identified document type by way of the automatic image processing unit 112. For example, the file processing unit 110 may categorize the social security card as a social security card and the driver's license as an approved government ID. The automatic image processing unit 112 may then extract at least one extractable data entry from each uploaded document 106, and may do so based on the identified document type. For example, by categorizing the social security card, the automatic image processing unit 112 may extract data entries known to be found on documents in that category (e.g., full legal name, SSN, country, and signature), and may look to certain fields or portions of a document to extract certain data entries for that document type. In some embodiments, certain categories or document types may signal to the system 100 that the uploaded document 106 contains one or more sensitive data entries (e.g., SSN for a social security card), and in response, the automatic image processing unit 112 may extract those sensitive data entries 108 and flag them for tokenization downstream.

Once the extractable data entry 108 has been extracted from the first uploaded document 106, the file processing device 110 (e.g. via the data quality and tokenization unit 114) may normalize the data according to the business ruleset. For example, if the uploaded document 106 includes a SSN, the extractable data entry 108 including an SSN may be transformed from 123-45-6789 format to a normalized 123456789 format. Further, the data quality and tokenization unit 114 may tokenize sensitive data entries (e.g., changing the normalized SSN from 123456789 to ihoBOe3Hh based on an encryption key). The system may store the unencrypted sensitive extractable data entry 108 only temporarily in RAM to further secure the sensitive data so that only the tokenized version of the sensitive data entry 108 is available stored on the system 100 with the decryption key being stored securely on system 100. In some embodiments the data quality and tokenization unit 114 may verify certain extractable data entries 108 that may include verifiable data. For example, the data quality and tokenization unit 114 may confirm that an extractable data entry 108 including a residential address on a driver's license is valid by comparing the extracted address to known valid addresses stored on the verification database 150 or identified by another trustworthy source. If the data quality and tokenization unit 114 identifies a discrepancy between the extracted address and known valid address (e.g., the extracted address of 123 Pine Rd, Washington, D.C. 12345 differs than the known valid address of 123 Pine Road, Washington, D.C. 12345-1111), it may update the normalized data entry to match the known valid address.

Once data has been normalized by the data quality and tokenization unit 114, the deterministic ID search unit 116 may perform a single or multilevel search. Optionally, the deterministic ID search unit 116 may filter the existing user account data entries (e.g., stored on database 130) based on the at least one extractable data entry 108 (e.g., to only existing user account data entries including an address with the zip code 12345 or a last name starting with "A") to limit the number of existing user account data entries used for the single or multilevel search. For example, if there are 500,000 data entries in the database 130, the deterministic ID search unit 116 may iteratively filter those entries by first limiting by zip code, then by first character for the last name, etc. to identify a subset of existing user account data entries within a target range between 1 to 1,000 entries. The deterministic ID search unit 116 may then determine whether zero, one, or more than one matches exist between the extractable data entry 108 and the existing user account data entries in the subset (or in database 130 if filtering has been skipped). In response to identifying one exact match or a single, near match exceeding a predetermined confidence threshold (e.g., there is a 95+% match because the zip codes are a digit off), the deterministic ID search unit 116 may link the uploaded document 106 to an existing user account on the user account database 130 associated with the matching existing user account data entry. When there is one exact match in the deterministic ID search, the system 100 may proceed to process the next document without performing a probabilistic ID search. However, if zero or multiple matches are identified or the single match does not exceed a predetermined confidence threshold, the probabilistic ID search unit 118 may execute the probabilistic ID search.

The probabilistic ID search unit 118 may run the probabilistic identification search to identify a highest ranked user account data entry corresponding to the normalized extractable data entry 108. The highest ranked user account data entry may be identified from a field that includes (a) the subset identified through filtering in the deterministic ID search, (b) all existing user account data entries in the database 130, or (c) all matches or near matches that exceed a predetermined minimum confidence threshold (e.g., if there were multiple 100% matches, multiple near matches above the 95% confidence threshold, or even multiple near matches above a lower, 75% confidence threshold, those matches and/or near matches could define the field). With the field of existing user account data entries defined, the probabilistic ID search unit 118 may rank or score each data entry using a random forest machine learning classifier. For example, the probabilistic search unit 118 may construct a large collection of decorrelated decision trees by sampling existing user account data entries and classifying any given data set into its respective category. The random forest model's decorrelated decision trees may each yield a vote for the best match to match between the extractable data entry 108 and the filtered subset of existing user account data entries. The random forest machine learning classifier may tally the votes of each of the decorrelated decision trees to identify the highest ranked user account data entry. When the highest ranked user account data entry in the field has been identified, the system 100 may link the uploaded document 106 to an existing user account associated with the highest ranked user account data entry. If the highest rank user account data entry falls below a predetermined confidence threshold (e.g., 95% match), the system 100 may prompt and operator to manually review the proposed match using the highest ranked user account data entry before linking the uploaded document 106 to an existing user account.

With the first uploaded document 106 (e.g., a social security card) processed, the system 100 may process a subsequent document 106 (e.g., driver's license) based on the processing of the first uploaded document 106 when multiple documents are received within a predetermined time window from the same user terminal 120. For example, when the driver's license is uploaded within 5 minutes of uploading the social security card, the system 100 may use the previously identified matching user account (and all data entries associated with the appropriate document type within that user account) as the filtered subset to first determine whether there is one exact match through the deterministic ID search. In other embodiments, the system 100 may retain the filtered subset of existing user account data entries used in the deterministic ID search for the social security card for the deterministic ID and/or probabilistic ID searches for the driver's license.

In yet another example, the user terminal 120 is known to be associated with the first user account and documents uploaded via the user terminal 120 are understood to be associated with the same first user account. The user terminal 120 may be a personal mobile computing device (e.g., a laptop, smart phone, etc.) associated with the user or a computing device housing an application that allows the user to securely login, allowing the system to recognize the associated first user account with uploaded documents 106 from the device. As a quality control measure or to fill in incomplete entries stored in the user account database 130, the system may verify the stored information corresponding to the first user account with the extractable data 108 from the uploaded document 106 and update, replace, or add to the stored information corresponding to the first user account before linking the uploaded document 106 to the first user account. For example, after logging into the mobile application and entering required information to submit an application for a loan, the user may be required to upload a Social Security document and other documents to complete the loan application. With the user already logged in, the system associates documents 106 uploaded via the user terminal 120 as being associated with the user's stored profile and loan application. When the user uploads the Social Security document, the system may categorize it as such and extract a group of two to four letter sequences as a first data entry 108 and a 9-digit sequence as a second data entry 108. The system may identify a "name" field corresponding to the first data entry and an "SSN" field as corresponding to the second data entry. The system may then compare each data entry with stored data entries in those respective fields for the user's profile or loan application (e.g., entries that the user recently entered manually via the mobile application). Based on the comparison, the system may update, replace, or add to each stored entry, and optionally mark entries as verified to identify stored entries that have verified as matching official documents on file. The system may then link the uploaded Social Security document 106 to the user's profile or loan application. If both data entries do not match corresponding stored entries, the system may send a message (e.g., via the mobile application) prompting the user to re-upload the document 106 or confirm the accuracy of the stored data entries in lieu of linking the uploaded Social Security document 106 to the user's profile or loan application. In doing so, the system can perform real-time quality control that verifies that stored information matches uploaded official documents 106 for a loan application and, if needed, prompt the user to address any issues or data inconsistencies while the user is actively applying for the loan rather than a less convenient time when the user has moved on to another activity.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

The invention claimed is:

1. A document source identification system comprising:
one or more processors; and
a memory in communication with the one or more processors and storing instructions that, when executed by the one or more processors, are configured to cause the system to:
receive a first uploaded document having a first document type of a plurality of predetermined document types each associated with a document category;
categorize the first uploaded document in a first document category based on the first document type;
extract at least one first data entry from the first uploaded document based on the first document category, the at least one first data entry comprising a first sensitive data entry comprising personally identifiable information;
identify a data entry type associated with the at least one first data entry at least in part based on one or more of a first proximate location of the at least one first data entry in the first uploaded document, a presence of one or more additional extractable data entries, and a second proximate location of the one or more additional extractable data entries;
normalize the first sensitive data entry according to a business ruleset to produce a normalized first data entry;
tokenize the normalized first sensitive data entry;
execute a deterministic identification search, comprising:
filtering a plurality of the user account data entries in a user account database based on one or more of the normalized first data entry or the data entry type associated with the normalized first data entry to identify a first subset of user account data entries, each user account data entry in the first subset of user account data entries being associated with an existing user account; and
determining that the normalized first data entry matches zero, one, or more than one user account data entries in the first subset of user account data entries;
execute, in response to determining that the normalized first data entry matches zero or more than one user account data entries in the first subset of user account data entries, a probabilistic identification search using a machine learning trained probabilistic model to identify a highest ranked user account data entry in the first subset of user account data entries;
link the first uploaded document to a first existing user account associated with either the one matching user account data entry in the first subset of user account data entries or the highest ranked user account data entry in the first subset of user account data entries.

2. The system of claim 1, wherein executing the probabilistic identification search further comprises:
scoring each user account data entry in the first subset of user account data entries using the machine learning trained probabilistic model; and
identifying the highest ranked user account data entry in the first subset of user account data entries.

3. The system of claim 2, wherein executing the probabilistic identification search further comprises using a random forest machine learning classifier.

4. The system of claim 1, wherein the at least one first data entry comprises a verifiable data entry corresponding to a verified data source, and the system is further configured to verify, based on communication with the verified data source, the verifiable data entry.

5. The system of claim 4, wherein the verifiable data entry comprises a user's street address.

6. The system of claim 1, wherein the system is further configured to:
receive a second uploaded document having a second document type of the plurality of predetermined document types;
categorize the second uploaded document in a second document category based on the second document type, the second document category indicating the presence of at least a second sensitive data entry comprising additional personally identifiable information, the personally identifiable information of the first sensitive data entry and the additional personally identifiable information of the second sensitive data entry each comprising a bank statement entry, a tax return entry, a social security number, or a driver's license entry;
extract at least the second sensitive data entry from the second uploaded document; and
tokenize the extracted second sensitive data entry.

7. The system of claim 1, wherein categorizing the uploaded document further comprises using a deep learning machine library.

8. The system of claim 1, wherein the plurality of predetermined document types comprises bank statements, tax returns, social security cards, and driver's licenses.

9. The system of claim 1, wherein extracting the at least one first data entry from the first uploaded document further comprises utilizing optical character recognition.

10. The system of claim 1, wherein the normalized first data entry used to identify the first subset of user account data entries comprises one or more of a full name associated with an existing user account, a social security number associated with the existing user account, and a soundex of the full name.

11. A document source identification system comprising:
one or more processors; and
a memory in communication with the one or more processors and storing instructions that, when executed by the one or more processors, are configured to cause the system to:
receive a first uploaded document having a first document type of a plurality of predetermined document types each associated with a document category;
categorize the first uploaded document in a first document category based on the first document type;
extract at least one first data entry from the first uploaded document based on the first document category;
identify a data entry type associated with the at least one first data entry at least in part based on one or more of a proximate location of the at least one first data entry in the first uploaded document, a presence of one or more additional extractable data entries, and a proximate location of the one or more additional extractable data entries;
normalize the at least one first data entry according to a business ruleset to produce a normalized first data entry;

filter, based on one or more of the normalized first data entry or the data entry type associated with the normalized first data entry, a user account database having a plurality of existing user accounts data entries each corresponding with an existing user account to identify a first subset of existing user account data entries;

determine whether the normalized first data entry matches a first existing user account data entry in the first subset of existing user account data entries;

when the normalized first data entry is determined to match the first existing user account data entry, link the first uploaded document to a first existing user account associated with the first user account data entry; and when the normalized first data entry is determined to not match the first existing user account data entry:
score each existing user account data entry in the first subset of existing user account data entries using a machine learning trained probabilistic model;
identify, via the machine learning trained probabilistic model, a first probabilistic existing user account data entry having the highest score; and
link the first uploaded document to a second existing user account associated with the first probabilistic existing user account data entry.

12. The system of claim 11, wherein the at least one first data entry comprises a sensitive data entry comprising personally identifiable information comprising a bank statement entry, a tax return entry, a social security number, or a driver's license entry, the instructions being further configured to cause the system to, in response to extracting the sensitive data entry the system, normalize the sensitive data entry and tokenize the normalized sensitive data entry.

13. The system of claim 11, wherein categorizing the uploaded document further comprises using a deep learning machine library.

14. The system of claim 11, wherein plurality of predetermined document types comprises bank statements, tax returns, social security cards, and driver's licenses.

15. The system of claim 11, wherein extracting the at least one first data entry from the first uploaded document further comprises utilizing optical character recognition.

16. The system of claim 11, wherein the normalized first data entry used to identify the first subset of user account data entries comprises one or more of a full name associated with an existing user account, a social security number associated with the existing user account, and a soundex of the full name.

17. The system of claim 11, wherein the machine learning trained probabilistic model further comprises using a random forest machine learning classifier.

18. A document source identification method comprising:
receiving a first uploaded document;
extracting at least one first data entry from the first uploaded document;
identifying a data entry type associated with the at least one first data entry at least in part based on one or more of a proximate location of the at least one first data entry in the first uploaded document, a presence of one or more additional extractable data entries, and a proximate location of the one or more additional extractable data entries;
normalizing the extracted at least one first data entry according to a business ruleset to produce a normalized first data entry;
executing a deterministic identification search, comprising:
filtering a plurality of the user account data entries in a user account database based on one or more of the normalized first data entry or the data entry type associated with the normalized first data entry to identify a first subset of user account data entries, each user account data entry in the first subset of user account data entries being associated with an existing user account; and
determining that the normalized first data entry matches zero, one, or more than one user account data entries in the first subset of user account data entries;
executing, in response to determining that the normalized first data entry matches zero or more than one user account data entries in the first subset of user account data entries, a probabilistic identification search using a machine learning trained probabilistic model to identify a highest ranked user account data entry in the first subset of user account data entries;
linking the first uploaded document to a first existing user account associated with either the one matching user account data entry in the first subset of user account data entries or the highest ranked user account data entry in the first subset of user account data entries.

19. The method of claim 18, wherein the first uploaded document has a first document type of a plurality of predetermined document types each associated with a corresponding document category, the method further comprising:
determining a first document category corresponding to the first document type; and
extracting the at least one first data entry from the first uploaded document based on the first document type.

20. The method of claim 18, wherein the at least one first data entry comprises a sensitive data entry and normalizing the extracted at least one first data entry comprises normalizing the sensitive data entry, the method further comprising tokenizing the normalized sensitive data entry before executing the deterministic identification search.

* * * * *